United States Patent [19]

Latvala

[11] Patent Number: 4,850,651
[45] Date of Patent: Jul. 25, 1989

[54] PROPORTIONING BRAKE CONTROL VALVE WITH CAGED TARE PRESSURE SPRING

[75] Inventor: Bruce E. Latvala, Grafton, Ohio

[73] Assignee: Allied-Signal Inc., Morristown, N.J.

[21] Appl. No.: 240,644

[22] Filed: Sep. 6, 1988

[51] Int. Cl.$^4$ ............................................. B60T 11/12
[52] U.S. Cl. ..................... 303/9.66; 303/7; 303/9.75
[58] Field of Search ............... 303/7, 9.62, 9.66, 9.72, 303/9.75, 40, 54

[56] References Cited

U.S. PATENT DOCUMENTS

| 4,571,007 | 2/1988 | Carmichael et al. | 303/7 |
| 4,725,101 | 2/1986 | Szudy et al. | 303/9.66 |
| 4,758,051 | 7/1988 | Szudy et al. | 303/7 |

Primary Examiner—Duane A. Reger
Attorney, Agent, or Firm—Ken C. Decker; William N. Antonis

[57] ABSTRACT

A proportioning control valve for heavy duty fluid pressure braking system includes a proportioning piston which is normally held in engagement with an abutment by control pressure. A tare pressure spring urges a caging member into engagement with a stop which is spaced a predetermined distance from the end of the proportioning piston, which is less than the distance between the valve engaging member carried by the proportioning piston in the proportioning valve member. Upon loss of pressure at the control pressure port, the proportioning piston is urged toward the caging member. The proportioning piston moves between the gap defined between the end of the proportioning piston and the caging member without opposition from the tare pressure spring, thereby permitting the full force of fluid pressure to break seal friction between the seals carried by the proportioning piston and the wall of the housing.

20 Claims, 1 Drawing Sheet

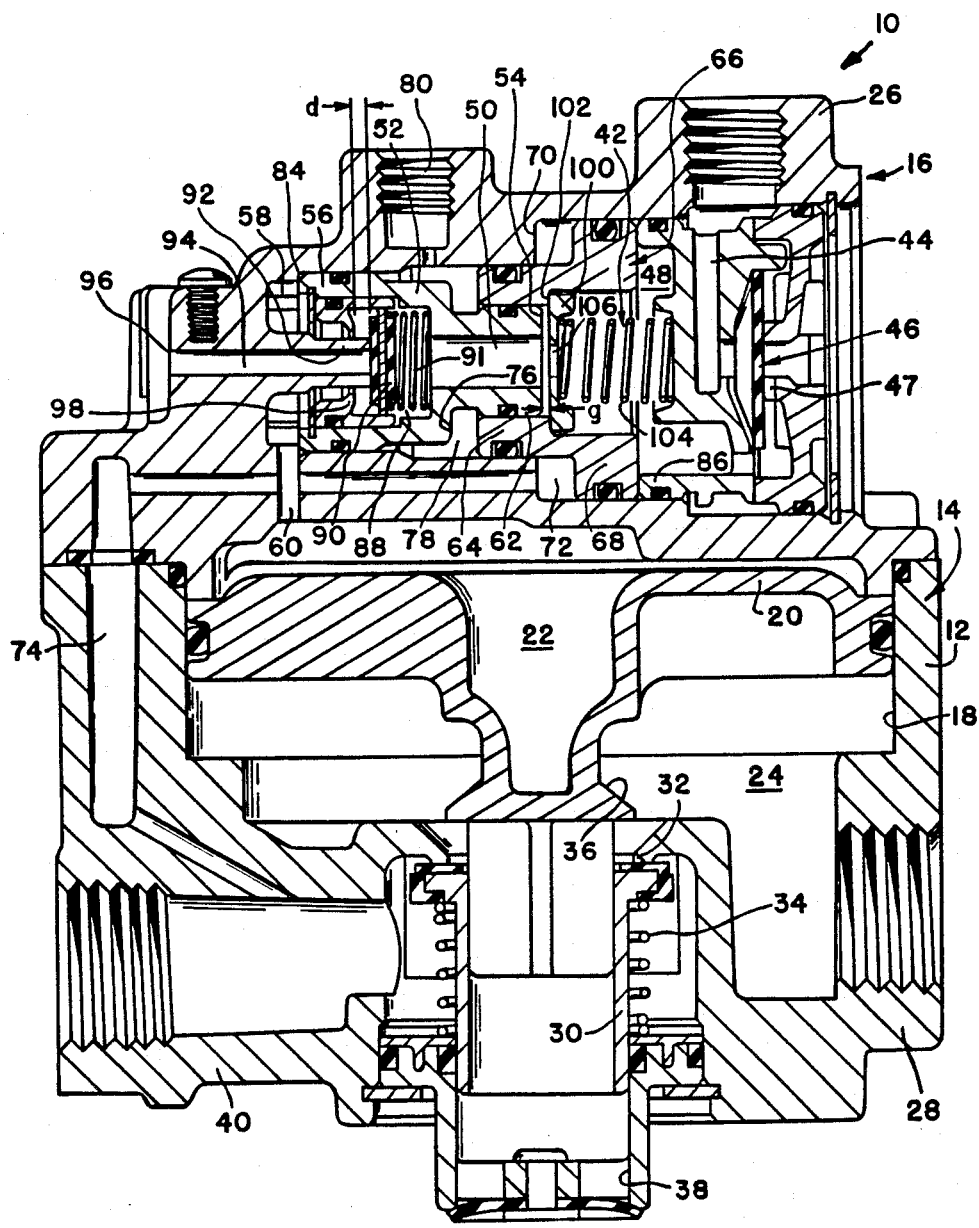

PROPORTIONING BRAKE CONTROL VALVE WITH CAGED TARE PRESSURE SPRING

This invention relates to a proportioning control valve for a fluid pressure braking system.

Proportioning control valves for heavy duty fluid pressure braking systems, such as those used to control heavy duty tractor-trailer vehicles, have been proposed before. In U.S. Pat. No. 4,725,101, a proportioning control valve is disclosed which controls the rear wheel brakes of the tractor portion of a tractor-trailer combination vehicle. The control valve includes a proportioning mechanism, but the proportioning mechanism is inoperative when the tractor and trailer are used as a combination vehicle, thereby assuring full braking pressure will be communicated to the rear wheel tractor brakes in normal usage. However, a special control port is communicated to the tractor protection valve, so that when the tractor is disconnected from the trailer, the proportioning mechanism is activated to effect a proportioned brake application, thereby proportionally reducing the pressure communicated to the tractor rear wheel brakes when the tractor is operated in the "bobtail" mode. The proportioning mechanism is also responsive to the service reservoir pressure to reduce the proportioning effect if the pressure level in the reservoir is reduced.

Since the tractor is normally used to pull a loaded trailer, the proportioning effect will not be used for long periods of time. The proportioning piston within the relay valve, which proportions communication of fluid pressure when the proportioning effect is necessary, requires a certain pressure level to be generated before the proportioning piston moves within the housing, because of seal friction generated by engagement of the seals carried by the piston with the wall of the housing. Since the proportioning piston is inactive for long periods of time, this breakaway friction may be substantial. Low ambient temperatures also increase the force necessary to break the piston loose from the wall of the housing. Accordingly, it has been customary to design the proportioning piston with relatively large fluid pressure responsive areas, so that the necessary breakaway force can be generated reliably. However, larger components, such as larger proportioning pistons, also require that the housing be made larger, which makes mounting the valve on the vehicle difficult. Accordingly, it is desirable that the valve housing be made as small as possible, while still providing reliable breakaway force on the proportioning piston when the proportioning effect is necessary.

The present invention permits a proportioning relay valve to be made smaller than prior art designs. Although a smaller proportioning piston is used, the force of the tare pressure spring, which prevents movement of the piston until a predetermined tare pressure is communicated to the brakes of the vehicle to permit the brakes to engage the drum, is withheld from the proportioning piston until the piston breaks away from the wall of the housing. Accordingly, the full force of fluid pressure acts against the proportioning piston, without being opposed by the force of the tare pressure spring, until the piston moves a small distance. This distance is insufficient to close off the proportioning valve members and thereby prevent communication through the piston. Accordingly, this breakaway force is generated without opposition by the tare pressure spring, thereby permitting the piston to be reduced in size over the size of a piston that would otherwise be necessary.

This and other advantages of the present invention will become apparent from the following description, with reference to the accompanying drawing, the sole figure of which is a cross-sectional view of a proportioning relay valve made pursuant to the teachings of the present invention.

Referring now to the drawing, a proportioning relay valve generally indicated by the numeral 10 includes a housing 12 having a relay section generally indicated by the numeral 14 and a proportioning control section generally indicated by the numeral 16. Relay section 14 includes a bore 18 defined within the housing 12 which slidably receives a conventional relay piston 20, which divides the bore 18 into sections 22, 24 on opposite sides of the relay piston 20. Section 22, as will hereinafter be described, is connected to a service port 26 through the proportioning section 16, and section 24 is communicated with delivery ports 28. Relay section 14 further includes a poppet member 30 slidably mounted within the housing 12 is which is urged into sealing engagement with circumferentially extending valve seating area 32 by a spring 34. Relay piston 20 also carries a circumferentially extending valve seating area 36 which is adapted to engage the poppet member 30 to control communication between section 24 and exhaust port 38. Communication between the section 24 and a supply port 40 is controlled by cooperation of the poppet member 30 with the valve seating area 32. Supply port 40 is communicated with the appropriate service reservoir, delivery port 28 is communicated to brake chambers (not shown) which effect vehicle brake actuation, and the service port 26 is communicated to operator actuated treadle valve.

A flow path generally indicated by the numeral 42 communicates the service port 26 with section 22. The flow path 42 includes a passage 44 which communicates service port 26 to chamber 48 through a quick release valve generally indicated by the numeral 46. Quick release valve 46 vents chamber 48 to atmosphere when the pressure level at the service port 26 drops quickly, but otherwise permits communication from passage 44 into chamber 48. If pressure drop at port 26 is slow, air flows through slot 47 on the inlet seat thereby allowing full communication and no (undesirable) pressure differential. Flow path 42 is also defined by a bore 50 which extends substantially coaxially through a conventional differential area proportioning piston generally indicated by the numeral 52. Piston 52 includes a smaller diameter end 54 which is responsive to the fluid pressure level in chamber 48, and an opposite larger diameter end 56 which is responsive to the fluid pressure level in outlet chamber 58 which is communicated to the section 22 through the passage 60. Larger diameter end 56 is responsive to fluid pressure in chamber 58, and smaller end 54 is received in a bore 62 defined in smaller diameter end 64 of secondary proportioning piston 66. A larger diameter end 68 of piston 66 cooperates with shoulder 70 on the wall of the housing 12 to define a control chamber 72 therebetween which is communicated with the supply port 40 (and therefore to the service reservoir to which supply port is connected) through a passage 74.

Smaller diameter end 64 of the secondary proportioning piston 66 cooperates with a shoulder 76 between the larger and smaller diameter ends of the proportioning piston 52 to define a control chamber 78 therebetween.

Control chamber 78 is communicated with control port 80, which is in turn communicated with the tractor protection valve (not shown), which provides the interface between the braking systems of the tractor and trailer portions of the combination vehicle. When the tractor portion braking system is connected to the trailer portion braking system, fluid pressure will be communicated into the chamber 78 through the port 80, but port 80, and therefore chamber 78, will be vented when the braking system of the tractor is disconnected from the braking system of the trailer which occurs when the tractor is being operated in the "bobtail" mode. Pressure in the chamber 78, during normal operation of a combination vehicle when the tractor is connected to the trailer, is normally sufficient to maintain the large diameter end 56 of the proportioning piston 52 in engagement with an abutment 84 defined within the chamber 58, and, in cooperation with the pressure in chamber 72, to maintain the secondary proportioning piston 66 in engagement with abutment 86 defined within the chamber 48.

The bore 50 defined within the proportioning piston 52 communicates the chamber 48 with a cavity 88 defined within the larger diameter end 56 of the proportioning piston 52. A valve member 90 is slidably received in the cavity 88 and is urged by a spring 91 into a sealing engagement with an extension 92 which projects into the cavity 88. Extension 92 defines an exhaust passage 94 therewithin, which communicates through exhaust port 96. Proportioning piston 52 further includes a radially inwardly projecting, circumferentially extending, valve member engaging seat 98. The valve engaging seat 98 is spaced from the valve member 90 by a distance d when the piston 52 is engaged with abutment 84.

A caging member 100 is slidably mounted in the chamber 48 and is yieldably urqed into engagemnt with a shoulder 102 defined on the secondary proportioning piston 66 between the chamber 48 and the bore 62 thereof by a tare pressure spring 104. When a brake application is effected, caging member 100 cooperates with the smaller diameter end 54 of proportioning piston 52 to define a gap g therebetween. The gap g is substantially smaller than the distance d defined between the valve engaging seat 98 and the valve member 90. An aperture 106 extends through the caging member 100 to permit unobstructed flow through flow path 42 through the caging member 100.

In operation, and assuming that the braking systems of the tractor and trailer connected to one another thereby assuring a predetermined pressure level at the control port 80 which is communicated into control chamber 78, the proportioning piston 52 will be retained against abutment 84 and the secondary proportioning piston 66 will be retained against the abutment 86. Accordingly, when a brake application is effected, substantially uninhibited communication is permitted through the flow path 42 from the service port 26 into the section 22 of bore 18 above the relay piston 20. Accordingly, pressure in section 22 urges the relay piston 20 downwardly viewing the figure, thereby causing the valve seating area 36 to engage the poppet member 30 to cut off communication between the section 24 of bore 18 and the exhaust port 38 and to initiate communication with the supply port 40. Since delivery port 28 is communicated to the aforementioned brake chambers, a brake application is effected by initiating communication between supply port 40 and section 24 of bore 18.

In this condition, of course, caging member 100 is maintained against the shoulder 102 and valve member 90 is maintained against the end of extension 92, thereby closing off communication between the flow path 42 and the exhaust port 96. Upon brake release, the pressure level in flow path 42 and in section 22 is vented through exhaust port 46.

When the braking systems of the tractor and trailer are disconnected, thereby venting control port 80 and control chamber 78, piston 52 is free to move, but the pressure in chamber 72 from the aforementioned reservoir maintains secondary proportioning piston in the position illustrated. Since the difference in areas between the smaller end 54 and larger end 56 of piston 52 is vented through the control port 80, a differential force acts across the piston 52, even though substantially equal fluid pressure levels act upon opposite ends of the piston. The differential force is generated by the fact that the fluid pressure acting on larger diameter portion 56 acts against a larger effective area than does pressure acting on end 54. Accordingly, the piston 52 moves to the right viewing the figure. Initial movement of the piston to close the gap g is unimpeded by the force of spring 104, thereby permitting the differential pressure forces acting across the proportioning piston 52 to overcome the friction generated by the seals carried by the piston. It will be noted that this gap g is, as discussed above, less than the distance d between the valve engaging seat 98 and the valve member 90. Accordingl, the piston 52 engages the caging member 100 before communication through the flow path 42 is cut off due to engagement of the valve engaging seat 98 with the valve member 90. Spring 104 is a relatively light spring; it impedes movement of the piston 52 only until sufficient pressure has been built in the flow path 42 in section 22 to cause a very small brake application, only sufficient to urge the brake shoes (not shown) against their corresponding drums (not shown). The piston remains in this position until the fluid pressure level in the flow path 42 is increased further, such that the force differential across the piston 52 is sufficient to overcome the force of the spring 104. When this occurs, the piston 52 urges the caging member 100 away from the shoulder 102, thereby permitting the valve engaging seat 98 to engage the valve member 90 and thereby proportion communication through the flow path 42 in a manner well known to the those skilled in the art, thereby establishing a proportionally lower fluid pressure level downstream of the valve member 90 than exists upstream of the valve member 90 in the flow path 42. Upon brake release, the pressure level in section 22 is proportionally decreased by venting the pressure through passage 94 and exhaust seat 96, also in a manner well known to those skilled in the art.

Since chamber 72 is communicated to supply port 40 and therefore to the pressure level in the braking reservoir, the secondary proportioning piston 66 will be responsive to the pressure differential, in case of loss of pressure in the rear service reservoir, between the pressure at service port 26 and the pressure level in the rear service reservoir, which is communicated into the chamber 72. If the pressure level in chamber 72 drops below the pressure level at service port 26 by more than a predetermined ratio, the secondary proportioning piston 62 will be urged into engagement with the shoulder 76 on proportioning piston 52, whereby the proportioning pistons 52, 66 move conjointly as a single piston with a larger effective area exposed to the pressure level at service port 26 and a smaller fluid pressure level exposed to the fluid pressure downstream of the valve member 90 in passage 60 in section 22. Accordingly, subsequent increases of fluid pressure at service port 26 will, as more fully described in the aforementioned U.S. Pat. No. 4,725,101, result in a proportionally greater increase of fluid pressure level in section 22 than occurs at service port 26, until the pressure level in section 22 is again equal to the pressure level at service port 26, whereupon uninhibited communication will again be permitted between port 26 and section 22.

I claim:

1. Proportioning control valve for fluid pressure braking system comprising a housing having a service port, a supply port, a delivery port, relay means for controlling communication between the supply port and the delivery port as a function of the fluid pressure level at the service port, means defining a flow path within said housing for communicating the service port with the relay means, and proportioning valve means in said flow path for proportioning fluid communication between the service port and the relay means to establish a proportionally lower fluid pressure level in said relay means with respect to the fluid pressure level at the service port, said proportioning means including a proportioning piston slidably mounted in said flow path and a valve member in said flow path, said proportioning piston including valve engaging means for cooperating with said valve member to proportion communication through the flow path and a tare pressure spring for biasing said proportioning piston to a position withholding the valve engaging means from the valve member, and cooperating means in said bore cooperating with the tare pressure spring and said proportioning piston for withholding the bias of said tare pressure spring from said proportioning piston until the latter has moved the valve engaging means to within a predetermined distance of the valve member.

2. Proportioning control valve for fluid pressure braking system as claimed in claim 1, wherein said cooperating means permits the bias of the tare pressure spring to be exerted upon said proportioning piston before the valve engaging means engages the valve member.

3. Proportioning control valve for fluid pressure braking system as claimed in claim 1, wherein said cooperating means includes a caging member and stop means in said flow path, said tare pressure spring urging said caging member into engagement with the stop means, said piston engaging said caging member when the proportioning piston has moved the valve engaging means to within said predetermined distance of the valve member, said proportioning piston being disengaged from both said tare pressure spring and from said caging member until the valve engaging means has been moved to within said predetermined distance of said valve member.

4. Proportioning control valve for fluid pressure braking system as claimed in claim 3, wherein said proportioning means includes a secondary piston cooperating with said proportioning piston, said flow path extending through said secondary piston, said caging member being slidably mounted in said secondary piston.

5. Proportioning control valve for fluid pressure braking system as claimed in claim 3, wherein said proportioning piston defines a pair of opposite ends and a cavity within the proportioning piston, said valve member being slidably mounted in said cavity, said valve engaging means projecting into said cavity for engagement with the valve member, and passage means defined within said proportioning piston for communicating said cavity with said opposite ends of the piston to thereby define a section of said flow path extending through the proportioning piston.

6. Proportioning control valve for fluid pressure braking system as claimed in claim 5, wherein said housing includes an exhaust port and exhaust passage defining means communicating with said exhaust port and projecting into said cavity through one end of the proportioning piston for engagement with said valve member, said exhaust passage defining means communicating said cavity with the exhaust port when the valve engaging means urges said valve member away from the exhaust passage defining means.

7. Proportioning control valve for fluid pressure braking system as claimed in claim 6, wherein said housing includes projecting means projecting into said flow path for engagement by said one end of the piston and the other end of the piston engages the caging means when the proportioning piston has moved the valve engaging means to within the predetermined distance of the valve member, said other end of the piston cooperating with the caging member to define a predetermined gap therebetween when the one end of the piston is in engagement with the projecting means.

8. Proportioning control valve for fluid pressure braking system as claimed in claim 7, wherein said proportioning piston moves a predecided distance between engagement with the projecting means and the position in which the valve engaging means cooperates with said valve member to proportion communication through the flow path, said predecided distance being greater than said predetermined gap.

9. Proportioning control valve for fluid pressure braking system as claimed in claim 8, wherein said housing includes a control pressure port, said proportioning piston including means responsive to the pressure level at the control pressure port to maintain the proportioning piston in engagement with the projecting means.

10. Proportioning control valve for fluid pressure braking system as claimed in claim 1, wherein said proportioning piston defines a pair of opposite ends, said housing including projecting means projecting into said flow path for engagement by one end of the piston, the other end of the piston engaging the caging means when the proportioning piston has moved the valve engaging means to within the predetermined distance of the valve member, said other end of the piston cooperating with the cooperating means to define a predetermined gap therebetween when the one end of the piston is in engagement with the projecting means.

11. Proportioning control valve for fluid pressure braking system as claimed in claim 10, wherein said proportioning means includes a secondary piston cooperating with said proportioning piston, said flow path extending through said secondary piston, said caging member being slidably mounted in said secondary piston.

12. Proportioning control valve for fluid pressure braking system as claimed in claim 10, wherein said proportioninq piston moves a predecided distance between engagement with the projecting means and the position in which the valve engaging means cooperates with said valve member to proportion communication through the flow path, said predecided distance being greater than said predetermined gap.

13. Proportioning control valve for fluid pressure braking system as claimed in claim 10, wherein said housing includes a control pressure port, said proportioning piston including means responsive to the pressure level at the control pressure port to maintain the proportioning piston in engagement with the projecting means.

14. Proportioning control valve for fluid pressure braking system as claimed in claim 1, wherein said proportioning piston defines a pair of opposite ends and a cavity within the proportioning piston, said valve member being slidably mounted in said cavity, said valve engaging means projecting into said cavity for engagement with the valve member, and passage means defined within said proportioning piston for communicating said cavity with said opposite ends of the piston to thereby define a section of said flow path extending through the proportioning piston.

15. Proportioning control valve for fluid pressure braking system comprising a housing having a service port, a delivery port, means defining a flow path within said housing for communicating the service port with the delivery port, and proportioning valve means in said flow path for proportioning fluid communication between the service port and delivery port to establish a proportionally lower fluid pressure level at said delivery port with respect to the fluid pressure level at the service port, said proportioning means including a proportioning piston slidably mounted in said flow path and a valve member in said flow path, said proportioning piston including valve engaging means for cooperating with said valve member to proportion communication through the flow path and a tare pressure spring for biasing said proportioning piston to a position withholding the valve engaging means from the valve member, and cooperating means in said bore cooperating with the tare pressure spring and said proportioning piston for withholding the bias of said tare pressure spring from said proportioning piston until the latter has moved the valve engaging means to within a predetermined distance of the valve member.

16. Proportioning control valve for fluid pressure braking system as claimed in claim 15, wherein said cooperating means includes a caging member and stop means in said flow path, said tare pressure spring urging said caging member into engagement with the stop means, said piston engaging said caging member when the proportioning piston has moved the valve engaging means to within said predetermined distance of the valve member, said proportioning piston being disengaged from both said tare pressure spring and from said caging member until the valve engaging means has been moved to within said predetermined distance of said valve member.

17. Proportioning control valve for fluid pressure braking system as claimed in claim 16, wherein said proportioning means includes a secondary piston cooperating with said proportioning piston, said flow path extending through said secondary piston, said caging member being slidably mounted in said secondary piston.

18. Proportioning control valve for fluid pressure braking system as claimed in claim 16, wherein said proportioning piston defines a pair of opposite ends and a cavity within the proportioning piston, said valve member being slidably mounted in said cavity, said valve engaging means projecting into said cavity for engagement with the valve member, and passage means defined within said proportioning piston for communicating said cavity with said opposite ends of the piston to thereby define a section of said flow path extending through the proportioning piston.

19. Proportioning control valve for fluid pressure braking system as claimed in claim 18, wherein said housing includes an exhaust port and passage defining means communicating with said exhaust port and projecting into said cavity through one end of the proportioning piston for engagement with said valve member, said exhaust passage defining means communicating said cavity with the exhaust port when the valve engaging means urges said valve member away from the exhaust passage defining means.

20. Proportioning control valve for fluid pressure braking system as claimed in claim 19, wherein said housing includes projecting means projecting into said flow path for engagement by said one end of the piston and the other end of the piston engages the caging means when the proportioning piston has moved the valve engaging means to within the predetermined distance of the valve member, said other end of the piston cooperating with the caging member to define a predetermined gap therebetween when the one end of the piston is in engagement with the projecting means.

* * * * *